(12) United States Patent
Nerone

(10) Patent No.: US 6,404,140 B1
(45) Date of Patent: Jun. 11, 2002

(54) HIGH FREQUENCY ELECTRONIC BALLAST FOR CERAMIC METAL HALIDE LAMP

(75) Inventor: Louis R. Nerone, Brecksville, OH (US)

(73) Assignee: General Electri Company, Schenectady, NY (US)

( * ) Notice: Subject to any disclaimer, the term of this patent is extended or adjusted under 35 U.S.C. 154(b) by 0 days.

(21) Appl. No.: 09/496,094

(22) Filed: Feb. 1, 2000

(51) Int. Cl.[7] .............................................. H05B 37/02
(52) U.S. Cl. .................... 315/209 R; 315/225; 315/307
(58) Field of Search ................................ 315/307, 291, 315/224, 225, 209 R, 219, 244, 276

(56) References Cited

U.S. PATENT DOCUMENTS

| 5,381,076 A | | 1/1995 | Nerone .................... 315/209 R |
| 5,612,594 A | | 3/1997 | Maheshwari ................ 315/224 |
| 5,710,489 A | * | 1/1998 | Nilssen ........................ 315/225 |
| 5,917,289 A | | 6/1999 | Nerone .................... 315/209 R |
| 6,075,326 A | * | 6/2000 | Nostwick ................... 315/307 |
| 6,124,682 A | * | 9/2000 | Lakin et al. ............. 315/209 R |

FOREIGN PATENT DOCUMENTS

| EP | 0 905 052 A1 | 12/1993 |
| EP | 0 765108 A2 | 3/1997 |

* cited by examiner

Primary Examiner—Don Wong
Assistant Examiner—Wilson Lee

(57) ABSTRACT

An electronic ballast for igniting a discharge arc in a discharge tube of a ceramic metal halide lamp. The ballast includes ballast circuitry for periodically applying a voltage pulse having an amplitude of approximately 2–3 kilovolts to the discharge tube until ignition of the discharge arc is achieved. Each voltage pulse consists of a voltage pulse train having a frequency exceeding the acoustic resonance range of the discharge tube, preferably in a range of 2.5–3.0 megaHertz. A hot restart protection circuit of the ballast circuitry provides that the time period between voltage pulses is sufficient to permit cooling of the discharge tube during a time interval spanning application of a plurality of voltage pulses. Thus, even if the discharge tube is in a hot condition and, under such conditions, an amplitude of a voltage pulse necessary for ignition exceeds the 2–3 kilovolt amplitude of the ballast circuitry voltage pulses, the periodic application of voltage pulses to the discharge tube will permit cooling of the discharge tube and correspondingly lowering the amplitude of a voltage pulse necessary for ignition. When the required voltage pulse amplitude for ignition has been reduced to the ballast circuit voltage pulse magnitude ignition of an arc in the discharge tube will occur.

6 Claims, 2 Drawing Sheets

HIGH FREQUENCY ELECTRONIC BALLAST FOR CERAMIC METAL HALIDE LAMP

FIELD OF THE INVENTION

This invention relates generally to an electronic ballast suitable for igniting a ceramic metal halide lamp and, more particularly, to a electronic ballast that utilizes high frequency short durations pulses to ignite a ceramic metal halide lamp.

BACKGROUND ART

Ceramic metal halide (CMH) lamps provide several advantages over conventional metal halide lamps including a more uniform color spectrum. A CMH lamp includes a discharge tube defining an interior region. Upon application of sufficient voltage across a pair of electrodes positioned within the interior region of the discharge tube, a high pressure arc is ignited in the discharge tube interior region.

However, certain operating characteristics of CMH lamps impose particular requirements and restrictions in the design of a ballast circuit to ignite and maintain an arc in a discharge tube of a CMH lamp. CMH lamps operate at high temperature and pressure. The ignition or break-over voltage required to ignite a CMH lamp discharge tube increases with increasing lamp temperature. A CMH lamp operated for a long period may have a discharge tube temperature exceeding 1000 degrees Celsius (° C.). A typical CMH discharge tube having a break-over voltage of around 1.5 kilovolts (kV) at room temperature can have a break-over voltage of 15–20 kV when the discharge tube temperature increases to 1100 degrees ° C. Unfortunately, application of break-over voltages above 5 kV may result in failure of the components of the ballast circuit. For example, a momentary drop in power supplied by an AC power line may cause the discharge arc to be extinguished during operation of the CMH lamp. It is desired to reignite the arc in the discharge tube as soon as possible to provide illumination. However, if under such a hot restart condition the ballast circuit attempts to generate an output voltage greater than 5 kV because the break-over voltage exceeds 5 kV, damage to the ballast circuit will likely result. Thus, the ballast circuit must allow the discharge tube to cool sufficiently so that the break-over voltage drops from 15 kV (or more) to below 5 kV and simultaneously must limit the output voltage applied to the discharge tube to 5 kV.

An additional concern of the design of a ballast for a CMH lamp is frequency. The CMH lamp comprises a tube with ceramic material in the form of salts disposed in the tube interior region. Undesirable bowing of the discharge arc is caused by excitation of the discharge tube, application of power to the discharge tube at an acoustic node. For a typical 20 watt (W) CMH lamp, the resonant nodes may range from audible frequencies to 300 kiloHertz (kHz). Many other resonant nodes may exist but the upper limit usually is less than 1 megaHertz (MHz). Fortunately, at frequencies above 1 MHz, the effect of the acoustic resonant frequency is negligible on the discharge tube arc. Thus, it is preferable that the ballast circuit drive the discharge tube at a frequency above 1 MHz.

Because of Federal Communications Commission (FCC) regulations regarding electromagnetic interference (EMI) emissions, it is desirable to excite the lamp at frequencies between 2.5 to 3.0 MHz as higher magnitudes of emissions are permitted by the FCC within this frequency range "chimney."

The electronic ballast should also provide protection against application of excess voltage under a hot restart condition of the discharge tube so as not to damage the ballast circuit components and allow the discharge tube to cool.

SUMMARY OF THE INVENTION

An electronic ballast for igniting an arc within a discharge tube of a ceramic metal halide (CMH) lamp. The electronic ballast includes a hot restart protection circuit to avoid application of an undesirably high voltage to the discharge tube during a hot restart situation. In one preferred embodiment, the ballast generates a series of short duration voltage pulses having a duration of 50 microseconds ($\mu$s) and are applied at rate of approximately 1 pulse/second. Each 50 $\mu$s pulse is comprised of a pulse train or a plurality of pulses having a peak voltage amplitude of between 2.0 to 2.5 kV (4.0 to 5.0 kV peak to peak).

The ballast periodically pulses the CMH lamp discharge tube approximately once per second until it ignites, that is, an arc is generated. The limitation on voltage amplitude (2.0 kV peak) of the voltage pulses prevents damage to the inverter circuit of the ballast from overvoltage application when the lamp is hot. The time between the 50 $\mu$s voltage pulses of just less than 1 second keeps the inverter circuitry components from overheating.

These and other objects, advantages, and features of an exemplary embodiment of the present invention are described in detail in conjunction with the accompanying drawings.

DETAILED DESCRIPTION OF THE EXEMPLARY EMBODIMENT OF THE INVENTION

Figure 1:
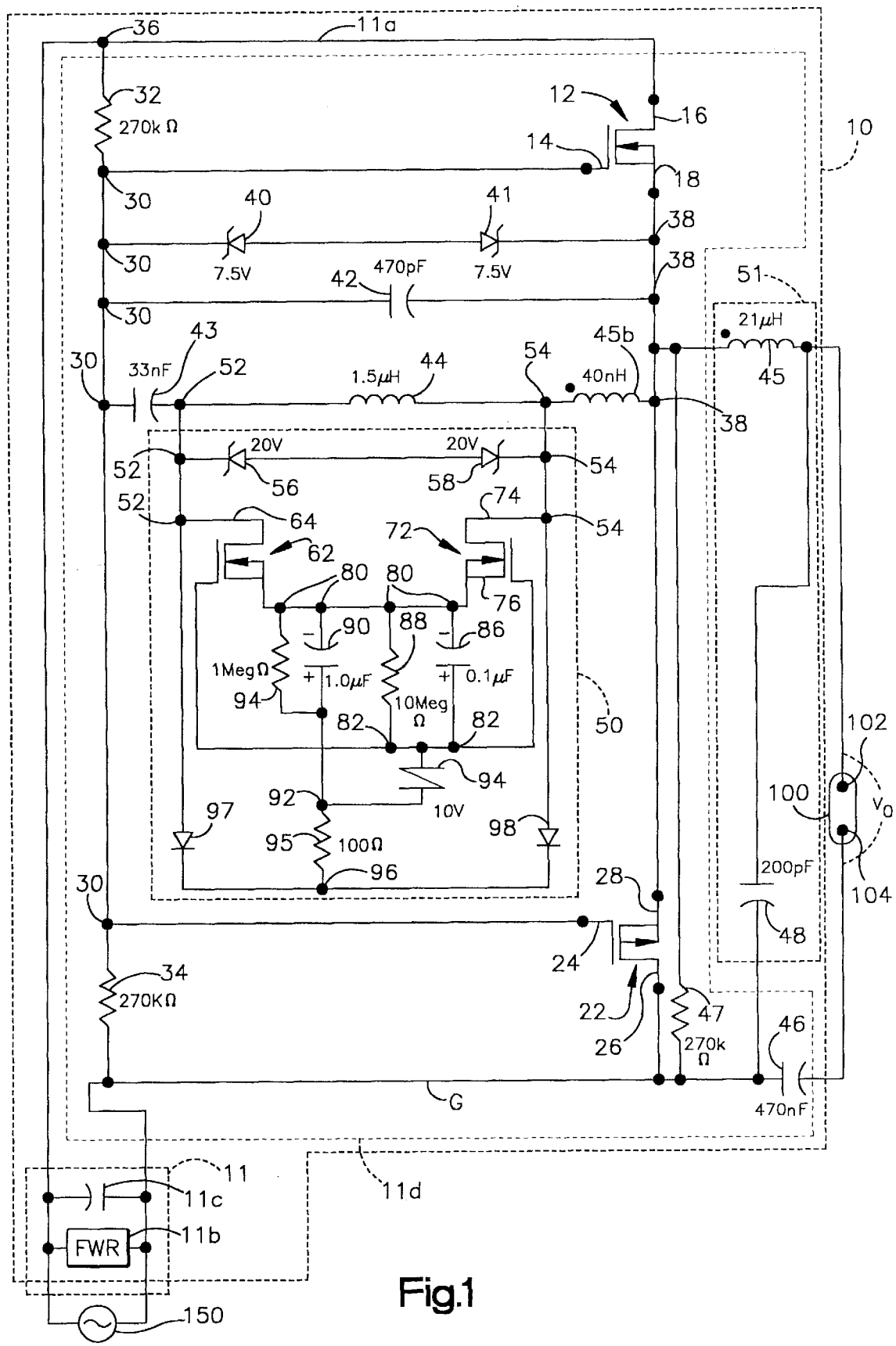
FIG. 1 is a circuit diagram of one preferred embodiment of the electronic ballast of the present invention.

An electronic ballast of the present invention is shown generally at 10 in FIG. 1. The electronic ballast 10 is used for igniting and maintaining an arc in a discharge tube of a ceramic metal halide (CMH) lamp. The discharge tube is shown schematically at 100 in FIG. 1. A spaced apart pair of electrodes 102, 104 extend into the interior region of the discharge tube 100. Upon application of a sufficient voltage potential difference across the electrodes 102, 104, a high pressure discharge arc is ignited within the discharge tube interior region. The ballast 10 is essentially an AC to AC converter that converts AC power line at 120 V and 60 Hz to an AC voltage and frequency suitable for igniting an arc in the discharge tube 100, e.g., 2.0 kV at 2.46 MHz, and, after ignition of the arc, to a voltage and frequency suitable for maintaining the arc in the discharge tube 100, e.g., 50 V RMS at 2.65 MHz if the discharge tube 100 is relatively cool and 2.6 MHz if the discharge tube is relatively hot (lamp has been operating). To initiate the arc in the discharge tube 110, the ballast 10 generates a periodic series of voltage pulses which are applied across the CMH discharge tube electrodes 102, 104. The series of voltage pulses are shown generally at 200 in FIG. 2 and a single voltage pulse 200*a* of the series of voltages pulse is shown in FIG. 3.

The ballast 10 includes rectification circuitry 11 to convert the AC 120 V power line voltage source 150 into a 160 V DC bus voltage present on the DC bus line 11a. The rectification circuitry 11 includes a fill wave bridge rectifier 11b of conventional design and an electrolytic capacitor 11c. The ballast further includes an inverter circuit 11d for converting the 160 V DC voltage present on the DC bus line 11a to an AC voltage suitable to: a) ignite an arc in the discharge tube 100; and b) maintain the discharge tube arc after ignition of the arc.

Advantageously, the ballast 10 which includes a hot restart protection circuit 50 excites a resonant LC tank network 51 (to be described below and which is shown in FIG. 1) to provide a pulsed output voltage, Vo, (FIG. 2) applied to the CMH lamp discharge tube 100 to ignite discharge in the tube. The time between pulses is sufficient to allow cooling of the discharge tube 100 between applications of the voltage pulses (the voltage pulses being labeled as 200a, 200b, 200c, 200d, 200e, 200f and generally as 200 in FIG. 2). Further, the hot restart protection circuit 50 limits the amplitude of the applied voltage pulses to a peak voltage of 2.0–2.5 kV (4.0–5.0 kV peak to peak) to avoid damage to circuitry components. Finally, the frequency of the pulse train comprising each output voltage pulse 200 is 2.46 MHz corresponding to the resonant frequency of the LC tank network 51.

It should be appreciated that while the preferred embodiment of the ballast 10 described below is suitable for use in conjunction with a 120 V AC voltage source 200, a 230 V AC voltage source could also be used to power the ballast 10 with appropriate changes to the circuit components of the ballast 10 to account for the higher DC voltage that would be present on the DC bus 11a. Similarly, while the ballast excites the LC tank network 51 to produce a 2.0–2.5 kV output voltage Vo at a frequency of 2.46 MHz (which is the resonant frequency of the tank network 51), it should be appreciated that other output voltage values below 5–6 kV and frequencies above 1 MHz (which is well above the first few harmonics of the discharge tube resonant frequency) would also be acceptable ballast circuit voltage output and frequency values.

In one preferred embodiment, the inverter 11d of the ballast 10 includes a pair of complementary enhancement type MOSFET transistors 12, 22. The transistor 12 is an n channel enhancement type MOSFET rated at an avalanche voltage of 250 V and the transistor 14 is an p channel enhancement type MOSFET also rated at an avalanche voltage of 250 V. The transistors 12, 22 both have their respective gate terminals 14, 24 coupled to a node 30 which is intermediate a pair of 270 kiloohm (kΩ) resistors 32, 34. The resistors 32, 34 are configured as a voltage divider coupled between the positive DC input voltage bus 36 and circuit common or ground G.

The drain terminal 16 of the MOSFET 12 is coupled to a node 36 on the positive DC input voltage bus 11a while the source terminal 18 of the MOSFET transistor 12 is coupled to the source terminal 28 of the MOSFET transistor 22. The drain terminal 26 of the MOSFET transistor 22 is coupled to circuit common or ground G. Coupled between the node 30 and a node 38 intermediate the MOSFET source terminals 18, 28 to limit voltage between the nodes 30, 38 are a pair of 7.5 V Zener diodes 40, 41 having their respective anodes coupled to clamp or limit voltage between nodes 30 and 38 to approximately +8.1 V to −8.1 V. The maximum 8.1 V magnitude results from a 7.5 V Zener breakdown voltage for the reversed biased Zener diode plus a 0.6 V diode drop across the forward biased Zener diode).

Also coupled between the nodes 30, 38 in parallel with the voltage clamping Zener diodes 40, 41 is a 470 picofarad (pF) capacitor 42. Additionally coupled between the nodes 30, 38 in parallel with the Zener diodes 40, 41 is a feed back path consisting of a 33 nanofarad (nF) capacitor 43, a 1.5 microhenry (μH) inductor 44 and a one turn 40 nanohenry (nH) tap or secondary winding 45b. The tap or secondary winding 45b is inductively coupled to a 21 μH primary winding 45a, thus a small portion (on the order of 1/35) of the current flowing through the primary winding 45a is fed back through the secondary winding 45b to make the inverter 11d output oscillate. The hot restart protection circuit 50 is coupled across the 1.5 μH inductor 44 and is not part of the inverter circuit 11d. The Zener diodes 40, 41 and the 1.5 μH inductor 44 function to control the phase angle between the voltage that is applied to the LC tank network 51 and the responding current flowing through the primary winding 45a.

The inverter 11d further includes the resonant LC tank network 51 comprising the 21 μH primary winding 45 and a 200 pF capacitor 48 which is coupled across the CMH discharge tube 100. The resonant frequency of the LC tank network is f=½π(LC)½ or approximately 2.46 MHz. A blocking capacitor 46 (470 nF) in series with the discharge tube 100 prevents the DC component of the output voltage Vo from being applied to the discharge tube 100. Coupled between the node 38 and ground is a 270 kΩ resistor 47.

Voltage across the hot restart protection circuit 50 is limited between +20.6 V to −20.6 V by a pair of 20 V Zener diodes 56, 58 connected at their anodes and coupled between nodes 52, 54. The Zener diodes 56, 58 function to limit the amplitude of the output voltage pulses 200. For the particular Zener diode values of 20 V, the amplitude of the output voltage pulses 200 is approximately 2 kV. By appropriately changing the Zener diode values, the amplitude of the output voltage pulses 200 could be increased or decreased as desired.

The hot restart protection circuit 50 includes a pair of n channel enhancement type MOSFET switching transistors 62, 72 having their respective drain terminals 64, 74 coupled to the nodes 52, 54. Coupled in parallel to a node 80 intermediate MOSFET source terminals 66, 76 and a node 82 intermediate MOSFET gate terminals 68, 78 is an RC circuit comprising a 0.1 μF capacitor 86 and a 10 megohm (MΩ) resistor 88 and having an-RC time constant of 1 sec. A second RC circuit comprising a 1.0 μF capacitor 90 in series with a 100 Ω resistor 95 having an RC time constant of 100 μsec is coupled in parallel between the node 80 and a node 96.

A silicon trigger switch 94 having a break over voltage of 10 V is coupled between the node 82 and a node 92. The trigger switch 94 will conduct in either direction if the voltage amplitude across the switch, regardless of voltage polarity, exceeds the break over voltage of 10 V. A 1 MΩ resistor 94 is coupled between the node 80 and the node 92. The respective cathodes of diodes 97, 98 are also coupled to the node 96. The anode of the diode 97 is coupled to the node 52 and the anode of the diode 98 is coupled to the node 54.

Circuit Operation

1) Steady State Operation

Under steady state operating conditions of the discharge tube 100, that is, where an arc is present in the tube 100, the discharge tube 100 essentially acts as a resistive load. Under such conditions, the hot restart protection circuit 50 does not effect operation of the inverter circuit 11d. The inverter circuit 11d acts as an AC current source driving the discharge tube 100 with a current of approximately 200 milliamps (mA) resulting in an output voltage Vo of 50 V RMS voltage across the discharge tube electrodes 102, 104 and an applied power of 10–12 watts (W).

The steady state frequency of the inverter circuit 11d is approximately 2.6 MHz which is slightly higher than the resonant frequency of the LC tank network 51. Note that the resonant frequency of the LC tank network 51 is constant at about 2.46 MHz, but it is the inverter circuit 11d can excite or operate the LC tank network at frequencies other than its resonant frequency so as to decrease the voltage output Vo. Thus, it is the inverter circuit 11d that actually determines the actual frequency of the output voltage Vo. The inverter 11d drives the LC tank network 51 with an approximately square wave waveform signal having a magnitude of 160 V which is present at node 38.

This 2.6 MHz steady state operating frequency of the inverter circuit 11d is advantageous since it is so far above the highest undamped acoustic resonant frequency of the discharge tube 100, which may be as high as 300 kHz. Operating at a frequency well above this highest acoustic resonant frequency avoids undesirable bowing of the arc in the discharge tube 100. Such bowing of the arc is to be avoided as it may result in color shift of the discharge tube illumination, flicker of the illumination and/or fracturing of the discharge tube 100. Additionally, applying power to the discharge tube 100 at 2.6 MHz maintains the fundamental frequency within the 2.5–3.0 MHz frequency range which extends the limit on conducted EMI to 70 dB $\mu$V (0 dB=1$\mu$V). The DC blocking capacitor 26 blocks the DC component of the output current. Operation of an electronic ballast circuit that includes an inverter circuit is disclosed in U.S. Pat. No. 5,917,289, issued on Jun. 29, 1999 to Louis R. Nerone et al. and assigned to the assignee of the present invention. U.S. Pat. No. 5,917,289 is hereby incorporated in its entirety by reference.

2) Hot Restart Operation

In the event that the power supplied by the AC power source 150 drops below the threshold level necessary to maintain the arc, the arc extinguishes and it is necessary to reignite the arc. As noted above, the discharge tube 100 heats up during operation and the break over voltage necessary to ignite the arc increases greatly with increasing discharge tube temperature. When the lamp 10 is hot, the break over voltage may far exceed 5 kV and in fact may be 30 kV or more. If the hot restart protection circuit 50 were not present, the inverter circuit 11d would attempt to drive an increasing AC voltage across the discharge tube electrodes 102, 104 to ignite the arc, ultimately overloading the capacity of the complementary MOSFET transistors 12, 22 and destroying the ballast circuit 10.

The hot restart protection circuit 50 advantageously operates to tune or limit the amplitude of the output voltage Vo that is applied by the inverter circuit 11d to the discharge tube 100 to approximately 2.0 kV (peak voltage). Additionally, the hot restart protection circuit 50 provides the output voltage as a series of 2.0 kV pulses having a short duration (about 50 $\mu$sec) with a period of approximately 1 second between pulse. The periodic 2.0 kV pulses are continued while the lamp is cooling until the arc is capable of being ignited by a 2.0 kV pulse and steady state operation (as described above) is thereby achieved.

The hot restart protection circuit 50 works as follows. When there is no arc in the discharge tube 100, the discharge tube acts as a high impedance. The hot restart protection circuit 50 is coupled across the 1.5 $\mu$H inductor 44 in the feedback path. During every 1 second period, for a time of 50 $\mu$sec, the hot restart protection circuit 50 is in a charging condition. During the charging condition, which has a duration of approximately 50 $\mu$sec, the hot restart protection circuit is equivalent to an open switch across the 1.5 $\mu$H inductor 44 and thereby permits the inverter circuit 11d in conjunction with the LC tank network 51 to operate near the resonant frequency of the LC tank network to apply a 2.0 kV pulse at 2.46 MHz across the discharge tube electrodes 102, 104. Recall that the amplitude of 2.0 kV of the output pulse is limited by the two 20 V Zener diodes 56, 58. If the discharge tube 100 has cooled sufficiently for an arc to be ignited by the 2.0 kV voltage pulse then ignition of the arc will occur. If the discharge tube 100 has not cooled sufficiently for an arc to be ignited, then the tube will continue to cool and another 2.0 kV pulse will be applied in approximately 1 second.

During the remainder of every 1 second period (1 second–50 $\mu$sec), the hot restart protection circuit operates as a closed switch or short circuit across the 1.5 $\mu$H inductor 44 and thereby forces the inverter circuit 11d to operate the LC tank network 51 higher than its resonant frequency thereby imposing a lower output voltage Vo across the discharge tube electrodes 102, 104. This low voltage cannot cause ignition of the arc and allows the tube to cool while also keeping the power dissipated in the inverter circuit components within safe limits.

Charging Condition of Hot Restart Protection Circuit

During 50 $\mu$sec charging time, the hot restart protection circuit 50 is an open switch across the 1.5 $\mu$H feedback path inductor 44. The AC. Feedback current through the secondary winding 45b charges the 1.0 $\mu$F capacitor 90 through the 100 $\Omega$ resistor 95 with an RC time constant of 100 $\mu$sec. The diodes 97, 98 and the intrinsic diodes associated with the turned off MOSFET transistors 62, 72 function as a full wave rectifier and charge the capacitor with the polarity shown in FIG. 1. During intervals where there is no arc in the discharge tube, approximately 20 V is present across the 1.5 $\mu$H inductor 44. Thus, in approximately 50 $\mu$sec the charge on the capacitor 90 charges to 10 V. During this 50 $\mu$sec duration, the output voltage Vo is has an amplitude of 2.0 kV and a frequency of 2.46 MHz Activation of Hot Restart Protection Circuit When the charge on the capacitor 90 exceeds 10 V, the silicon switch 94 (having a 10 V break over voltage) turns on and some of the charge from the capacitor 90 is transferred to the 0.1 $\mu$F capacitor 86 through the switch 94. Since the value of the capacitor 86 is $\frac{1}{10}$ the value of the capacitor 90, the capacitor 86 charges to about 8–9 V in about 60 $\mu$sec. When both capacitors 86 and 90 have the same voltage, approximately 8–9 V because of the 10:1 value difference between the capacitor, the current through the switch drops to near 0 A and the switch turns off.

When the charge on the capacitor 86 reaches approximately 8–9 V, the MOSFET transistors 62, 72 turn on and essentially provide a low impedance path in parallel with the 1.5 $\mu$H inductor 44. Turning on the MOSFET transistors 62, 72 shunts current away from the inductor 44 thereby changing the frequency of the inverter circuit 11d to approximately 3.0 MHz which is higher than its resonant frequency of 2.46 MHz. Forcing the LC tank network to operate at a frequency of 3.0 MHz effectively reduces the voltage output, Vo, across the discharge tube electrodes 102, 104 to a much lower value (approximately 100 V as is seen in the portions of the output voltage labeled 201a, 201b, 201c, 201d, 201e, 201f in FIG. 2.

When the voltage of the capacitor 86 falls below the threshold voltage of the MOSFET transistors. 62, 72 (about 3 V on capacitor 86), the transistors 62, 72 turn off. This occurs approximately one second after turn on as the capacitor 86 discharges though the 10 MΩ resistor 88. The relatively slow discharge of the capacitor 86 from 8 V to 3 V is due to the 1 second time constant of the capacitor 86 and the resistor 88. When the voltage of the capacitor 86 drops to about 3 V, the transistors 62, 72 shut off and the current shunting effect of the hot restart protection circuit 50 with respect to the 1.5 μH inductor 44 ends. If no arc has been ignited in the discharge tube 100, the capacitor 90 begins its 50 μsec charging cycle to 10 V and the inverter circuit 11d returns to operating the circuit LC tank network 51 at 2.46 MHz and applies a 2.0 kV voltage pulse to the discharge tube electrodes 102, 104 as described in the charging condition section set forth above.

Stated another way, the way the hot restart protection circuit 50 changes the frequency of the inverter circuit 11d by periodically shunting current away from the 1.5 μH inductor 44. Since the inductor 44 is in series with the one turn secondary winding 45 which, in turn, is inductively coupled to the resonant LC tank network primary winding 45, by shunting current away from the inductor 44, the phase angle of the gate driving voltage decreases causing the inverter circuit frequency to increase.

During steady state operation, that is, when there is an arc in the discharge tube 100, the hot restart protection circuit 50 is in a charging condition. However, since the discharge tube 100 provides a resistive load when the arc is present, the voltage present across the inductor 44 is not sufficiently high to charge the capacitor 90 to the break over voltage of 10 V required by the silicon switch to turn on and activate the hot restart protection circuit 50. Thus, the hot restart protection circuit 50 remains the equivalent of an open switch across the inductor 44 and the inverter circuit 11d operates at around 2.6 MHz, its steady state frequency.

Figure 2:
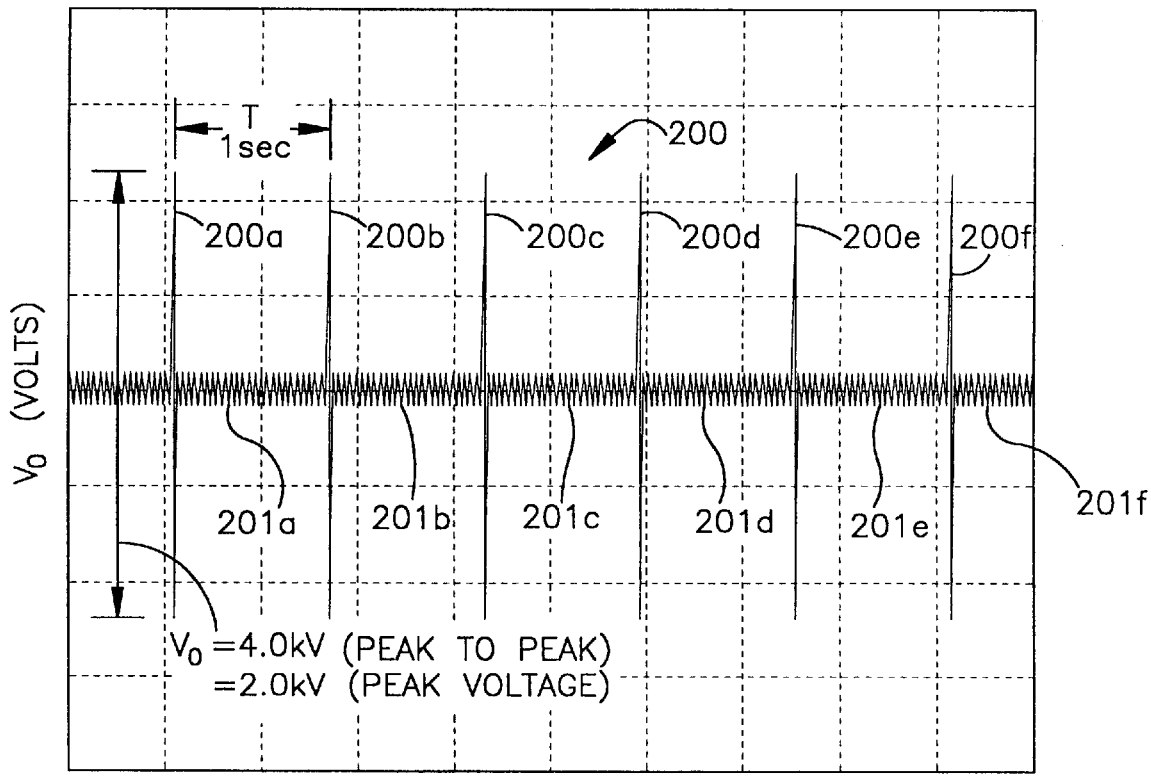
FIG. 2 is a schematic representation of a series of output voltage pulses generated by the electronic ballast of FIG. 1.
Figure 3:
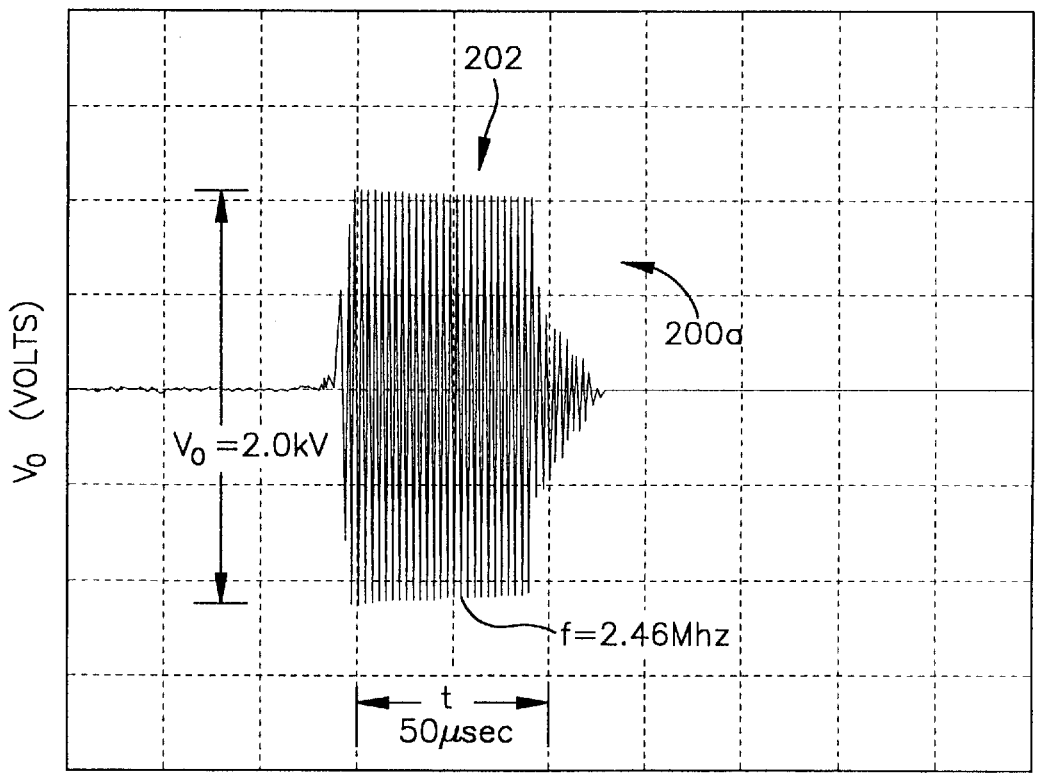
FIG. 3 is a schematic representation of one envelope of the series of output voltage pulses of FIG. 2.

FIG. 2 clearly illustrates the voltage pulsing effect of Vo achieved by the hot restart protection circuit 50. As can be seen Vo comprises a series of voltage pulses 200, specifically 200a, 200b, 200c, 200d, 200e, 200f that occur when the hot restart protection circuit 50 is in the charging condition. Each pulse 200 has a magnitude of 2.0 kV to 2.5 kV and a pulse duration, t, of approximately 50 μsec and a frequency of approximately 2.46 Hz. A period, T, between voltage pulses 200 is approximately 1 second. For the remainder of the time, that is, the times between the 50 μsec voltage pulses 200a, 200b, 200c, 200d, 200e, 200f, the output voltage Vo has an amplitude of approximately 100 V and a frequency of approximately 3.0 MHz. These in-between pulse times when the hot restart protection circuit 50 is in the discharging condition are labeled as 201a, 201b, 201c, 201d, 201e, 201f. As the CMH lamp discharge tube 100 cools, the amplitude of the voltage necessary to ignite a discharge correspondingly drops. Depending on the specific characteristics of the discharge tube 100, the temperature of the tube at which a 2.0 kV pulse would be sufficient to initiate a discharge would vary. If a 2.0 kV pulse initiates discharge in the discharge tube 100, the output voltage Vo across the discharge tube electrodes 102, 104 falls to around 50 V RMS initially because of the conduction through the discharge tube. This conduction through the discharge tube 100 effectively shuts off the hot restart protection circuit 50.

Advantageously, in the present invention, the duty cycle of the voltage pulses 200 is sufficiently low to avoid overheating of the components of the ballast 10 and, indeed, to permit cooling of the CMH lamp 100 if it is at a temperature above the critical value at which a 2.0 kV voltage pulse will initiate discharge in the discharge tube 100. Thus, if the CMH lamp 100 is at a temperature above the critical temperature, the ballast 10 will cause a 50 μsec voltage pulse 200 to be applied to the CMH lamp 100 every 1 second until such time as the lamp 100 cools to the critical temperate. When the CMH lamp 100 cool to or below the critical temperature, a voltage pulse 200 will ignite the lamp 100. Moreover, the amplitude of the voltage pulses 200 generated by the ballast 10 is limited to 2–2.5 kV thus avoiding failure of the inverter circuit 11d because of excessive power dissipation by the inverter circuit components. If the ballast 10 did not have voltage limitation, the voltage generated would rise to whatever level was necessary to ignite a discharge in the discharge tube 100. Under conditions where the discharge tube 100 was very hot, the voltage application necessary to ignite a discharge would be sufficient to cause failure of the inverter circuit 11d.

The voltage output Vo across the electrodes. 102, 104 of the CMH lamp discharge tube 100 is schematically illustrated in FIGS. 2 and 3. FIG. 3. better illustrates the amplitude and frequency of a selected one of the series of output voltage pulses, namely 200a. The voltage pulse 200a has a magnitude of approximately 2.0 kV, a pulse duration, t, of approximately 50 μsec and a frequency of approximately 2.46 MHz. The pulse 200a may be viewed as a 50 μsec duration envelope comprised of a pulse train 202 of bipolar voltage waveforms having a frequency of approximately 2.46 MHz and a voltage range of 100 V to approximately 2 kV.

While the preferred embodiment of the present invention has been described with a degree of particularity it is the intent that the invention include modifications from the disclosed design failing within the spirit or scope of the appended claims.

What is claimed is:

1. An electronic ballast for igniting a discharge arc in a discharge tube, the ballast comprising:

ballast circuitry utilizing an inverter circuit and an LC network to generate a high voltage pulse having an amplitude sufficient to ignite the discharge in the discharge tube arc, the voltage pulse having a duration and being applied to the discharge tube once per predetermined period until ignition of the discharge arc is achieved, said ballast circuitry comprising a hot restart protection circuit that when activated shunts current away from an inductor in a feedback path of the inverter causing a frequency of the inverter circuit to increase, the frequency of the inverter changing between first and second frequency values, the first frequency value resulting in generation of the voltage pulse and the second frequency value resulting in a voltage waveform having a substantially lower amplitude than the voltage pulse.

2. The electronic ballast of claim 1 wherein activation of the hot restart protection changes the inverter circuit frequency from the first frequency value to the second frequency value.

3. The electronic ballast of claim 1 wherein the hot restart protection circuit includes a pair of MOSFET transistors whose respective drain terminals are coupled across the inductor in the feedback path, activation of the hot restart protection circuit occurring when the MOSFET transistors turn on thereby shunting current away from the inductor.

4. The electronic ballast circuit of claim 3 wherein the hot restart protection circuit further includes respective gate and source terminals of the MOSFET transistors being coupled across a capacitor, and when the capacitor is charged to a predetermined voltage level, the MOSFET transistors being turned on.

5. The electronic ballast of claim 4 wherein the capacitor is charged by charge transferred from a second capacitor through a silicon switch that switches to a conductive state when the charge on the second capacitor reaches a predetermined voltage.

6. The electronic ballast of claim 5 wherein the second capacitor is charged to the predetermined voltage through a full wave rectification circuit comprising a pair of diodes whose respective anodes are coupled across the feedback path inductor and a pair of intrinsic diodes through the MOSFET transistors when the transistors are turned off.

* * * * *